Patented Apr. 28, 1953

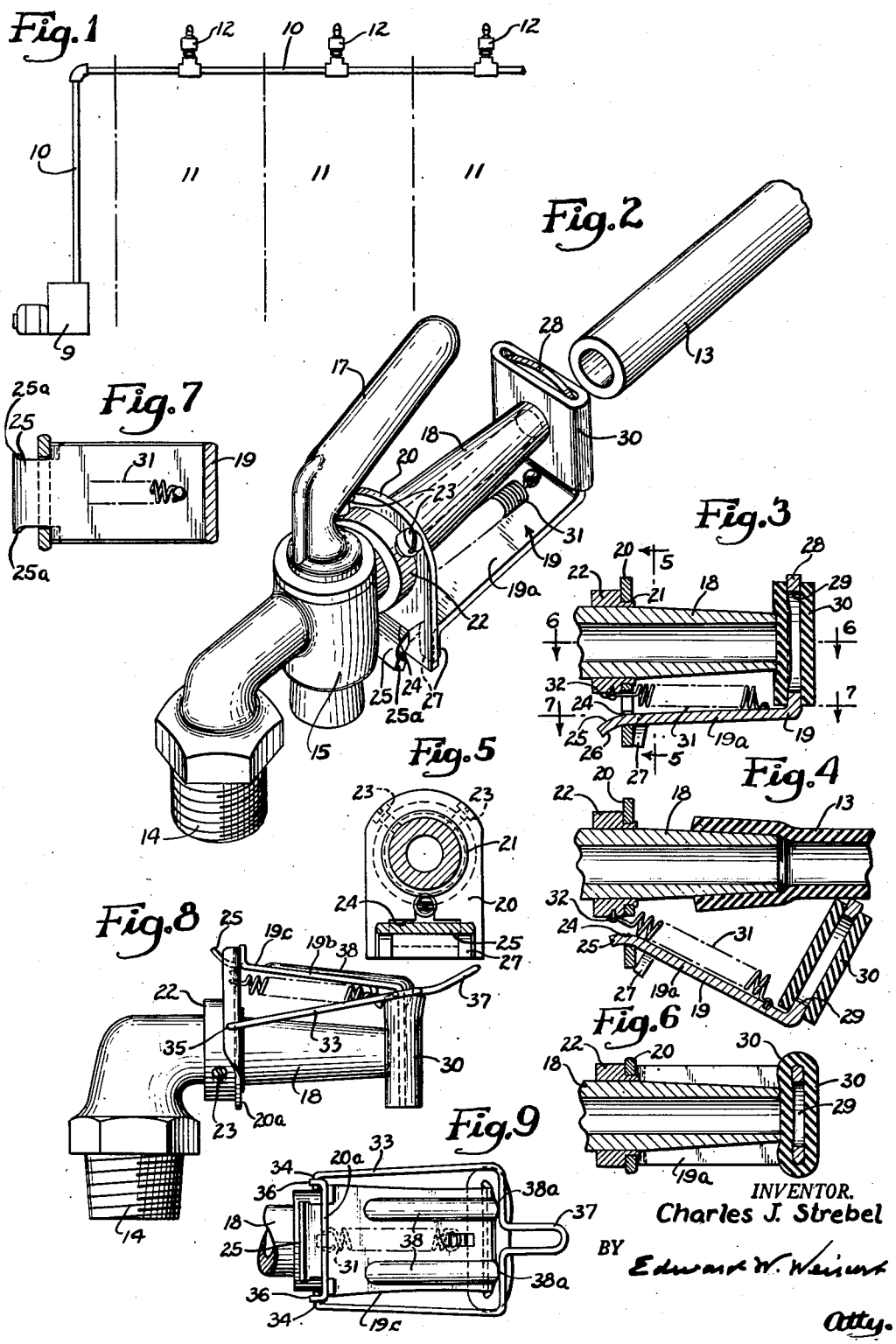

2,636,518

UNITED STATES PATENT OFFICE 2,636,518

STALL COCK FOR MILKING MACHINES

Charles J. Strebel, Chicago, Ill.

Application April 10, 1951, Serial No. 220,208

11 Claims. (Cl. 137—708)

This invention relates to an improvement in stall cocks for milking machines and concerns itself with an automatic closure for closing the outer end of the nozzle of the cock, which can be readily applied to existing cocks or pipes which can be quickly displaced for the attachment of the hose of the milking machine and which will automatically close the pipe line when the hose is removed, and keep the pipe line sealed.

A further feature of the invention exists in positive locking means for locking the closure in closed position in the event that it is desired to flush the pipe line.

When ordinary valves are used, it often happens that the cows in playing with the valve handle will open the vacuum line requiring an attendant to check all the valves before a milking operation begins. Then the cows may play with the valves during the milking period and open the same and destroy the vacuum. This invention is designed to overcome this objection in providing a closure means for the open end of the nozzle that acts automatically to move to closed or sealing position should it be tampered with by a cow.

This invention has several advantages over prior devices in that it does not require a valve and prevents a cow from putting saliva or cud material into the pipe line and acts automatically to close the pipe line when not in use, and acts automatically to keep the vacuum line sealed.

The invention comprises the novel structure and combination of parts hereinafter described and more particularly pointed out and defined in the appended claims.

In the accompanying drawing which illustrates a preferred form of this invention and in which similar reference numerals refer to similar features in the different views:

Fig. 1 is a fragmentary plan view of the piping system in cow stalls illustrating an application of this invention;

Fig. 2 is an enlarged view of a stall cock involving this invention;

Fig. 3 is a fragmentary sectional view taken centrally through the cock nozzle;

Fig. 4 is a view similar to Fig. 3 but with the closure displaced and a milking machine hose attached to the nozzle;

Fig. 5 is a sectional view taken upon the line 5—5 of Fig. 3 looking in the direction of the arrows;

Fig. 6 is a sectional view taken upon the line 6—6 of Fig. 3 looking in the direction of the arrows;

Fig. 7 is a sectional view taken upon the line 7—7 of Fig. 3 looking in the direction of the arrows;

Fig. 8 is an elevation view of a modified form of the invention; and

Fig. 9 is a fragmentary top plan view of Fig. 8.

In referring now to the drawing, there is shown in Fig. 1 a compressor 9 which is adapted to create a vacuum in the pipe line 10 which extends across a plurality of cow stalls 11 and which has a cock 12 at each stall to which the hose 13 of a milking machine is adapted to be attached.

In the present instance, several forms of stall cocks have been illustrated to which my invention may be applied. In Fig. 2 there is shown the common form of cock having a downturned threaded end 14 adapted for attachment to the pump or compressure line 10 and having a valve housing 15 provided with a valve 16 having a handle 17. A nozzle 18 extends from the valve housing for attachment of the hose 13 of a milking machine. When such a valve with a handle 17 is used to control the pipe line, it is possible for a cow to engage the valve handle and open the same, at the same time, the cow may lick the open end of the nozzle and insert saliva or parts of cud therein which is highly objectionable.

My invention is desired to overcome such objections in the provision of a nozzle closing unit 19 which can be applied to any nozzle. This unit is shown as consisting of an attaching plate 20 having a circular aperture 21 into which a hollow bearing hub 22 extends, which hub is adapted to be slipped upon the nozzle 18 and secured by screws 23 at the rear end of the nozzle.

The plate 20 extends downwardly some distance below the nozzle 18 where it is provided with a slot 24 through which a tongue 25 on an angular closure plate 19a extends. The tongue 25 has lateral locking lugs 25a made after assembly. Beyond the slot the tongue 25 is curved downwardly as indicated at 26 and upon the other side of the slot, the closure plate has downturned bearing lugs 27 upon each side of the tongue. These lugs 27 form fulcrums with respect to the plate 20. Thus a slidable hinge connection is provided for the closure plate. This closure plate 19a has an upwardly extending frame 28 at its forward end. The upwardly extending frame is formed by bending the forward portion of the plate upwardly at substantially right angles and forming a large aperture 29 therethrough for a purpose that will later appear. A rubber or suitable flexible sheath 30 is slipped over the upright frame or end of the plate 19a. A coil spring 31 which is anchored at its forward end to the closure plate and at its rear end to the bearing hub 22 as indicated at 32 serves to draw the upright sheathed end of the closure unit tightly against the open end of the nozzle 18. The hub plate has a suitable opening for the spring 31 to pass therethrough.

In Fig. 8 there is shown a slightly modified form of stall cock which also has an attaching portion 14 for attachment to the vacuum line 10 and a nozzle 18 which extends directly from the attaching portion 14 and omits the valve-housing and valve. In the use of the closure involving this invention, no such valve as shown in Fig. 2 is necessary. In this form, the closure unit 19c is slipped over the nozzle and fastened by set screws or the like 23 as in the first form.

In Figs. 8 and 9, the closure unit is shown as extending over the nozzle instead of under it, and it is adapted to swing upwardly instead of downwardly as in the first form. The unit is adapted to be attached to the nozzle to either swing downwardly as in the first form or to swing upwardly as shown in Figs. 8 and 9.

In some states, it is required that the stall cocks be susceptible of being positively sealed against discharge in the event that the pipe line is to be flushed. For this purpose, the closure unit in Figs. 8 and 9 is shown as provided with a positive lock which consists of a wire bail 33 having its two arms inturned at their terminals as indicated at 34, which inturned terminals are journalled in suitable bearing apertures 35 formed in side flanges 36 on the mounting plate 20a. The closed end of the bail is provided with a handle 37 which in the present instance is shown as consisting of an integral part of the bail. In this modified form, the bottom of the closure leg 19b is provided with spaced parallel ribs or outwardly embossed portions 38, the forward ends 38a of which serve as locking abutments for the closed end of the bail when the same is swung thereover.

When it is desired to open the nozzle in the modified form, the handle of the bail is grasped and swung upwardly to unlock the closure unit which may then be swung upwardly for the attachment of the hose 13 of the milking machine to the nozzle 18. When the closure unit is in closed position and it is desired to lock the same in such position, the bail can be swung down to engage over the ends of the ribs 38 thus preventing the closure unit from being opened.

It will be understood that the closure unit is in the form of a separate attachment which can be attached to any nozzle of a cock, whether it contains a valve as shown in Fig. 2 or whether it has no valve as shown in Fig. 8. It can hence be readily attached to existing stall cocks which are equipped with valves, and it can be attached to swing upwardly or downwardly.

When the closure unit is applied to a cock as shown in Fig. 2 or 8, the spring 31 will draw the closure head with its covering tightly against the open end of the nozzle, and due to the opening in the closure head 28, the suction will tend to draw the rubber covering into the end of the nozzle and firmly seal the same.

To apply the milking machine hose to the nozzle 18, the closure is swung down as shown in Fig. 4 or upwardly as in Fig. 8. During this operation, the fulcrum lugs 27 will fulcrum against the plate 20 while the curved tongue 25 will partially ride out of the slot 24. When the head 28 has cleared the nozzle, the milking machine hose 13 can be slipped over the nozzle and the closure released.

When the hose is removed for attachment to another stall cock, the spring 31 will immediately swing the closure to closing position as shown in Fig. 3 in which the vacuum in the line 10 will tend to draw the flexible valve head into the nozzle and firmly seal the same; and if the locking bail is used, it can be swung over the closure end and securely lock the same in closed position.

From the foregoing, it will be appreciated that the cock closing unit involving this invention possesses numerous advantages, in that it can be produced as an article of manufacture, that it can be easily applied to the nozzle of any cock and that it effectively seals the same, and where a vacuum line is used, it utilizes the suction to obtain an effective seal.

I am aware that many changes may be made and various details of construction may be modified without departing from the principles of this invention, so I do not propose limiting the patent granted otherwise than necessitated by the appended claims.

I claim:

1. In a stall cock having a nozzle, a closure unit for closing the end of said nozzle, said unit comprising a vertical plate having a bearing aperture for receiving said nozzle, means for securing said plate to said nozzle, said plate having a slot, an L-shaped closure having a horizontal portion provided with a tongue extending through said slot and a fulcrum lug upon each side of said tongue for abutting said plate and a vertical portion for closing the end of said nozzle, and yielding means connecting said closure with said plate for urging said vertical portion against the open end of said nozzle.

2. In a stall cock having a nozzle, means for closing the outer end of said nozzle comprising a removable member upon said nozzle and having an extension, an L-shaped plate having a horizontal portion slidably hinged to the said extension of said member and having means engaging the open end of said nozzle and yielding means connecting said plate and member for the purpose set forth.

3. In a stall cock having a nozzle, means for closing the outer end of said nozzle comprising a closure unit having a bearing plate secured to said nozzle and having an extension, a closure member slidably hinged to said extension and engaging the open end of said nozzle and a spring connecting said closure member to said plate and effective for normally urging said member against the open end of said nozzle.

4. A stall cock as set forth in claim 3 in which the closure member embodies an open frame with a flexible sheath extending over said frame whereby suction in said nozzle will tightly draw said flexible sheath and frame against the open end of said nozzle.

5. As an article of manufacture, a closure unit for a stall cock, comprising a support having a bearing aperture and an extension beyond said aperture, an L-shaped plate having a longitudinal leg slidably hinged in said extension and having a vertical portion adapted for closing the end of the nozzle on a stall cock, and yielding means connecting said L-shaped plate and support.

6. In a structure as set forth in claim 5 in which the vertical portion on the L-shaped plate constitutes an open frame and a flexible sheath covering said frame.

7. In a stall cock having an open ended nozzle, a plate member having an aperture for receiving said nozzle, a closure member hinged to said plate member beyond said aperture and swingable over the open end of said nozzle and a locking member hinged to said plate member and swingable over said closure member for locking said closure member in closed position.

8. In an attachment for a stall cock having a nozzle, a plate member having a bearing aperture for receiving said nozzle and an extension beyond said aperture; an L-shaped plate having an arm hinged to said extension and a nozzle sealing member at an angle to said arm adapted for sealing the end of the nozzle; and a bail member on said plate movable over said nozzle sealing member for locking the same in sealing position.

9. An attachment for stall cocks comprising a plate having a bearing aperture adapted for fitting over the nozzle of the stall cock, said plate having an extension beyond said aperture, said extension having a transverse slot, an L-shaped plate having a horizontal portion slidably mounted in said slot and having means for slidably anchoring the same therein and having a vertical portion adapted for closing the end of said nozzle and yielding means connecting said plate L-shaped member.

10. In a stall cock having a nozzle, means for closing the end of said nozzle comprising a plate having an aperture for receiving said nozzle and an extension having a transverse slot, an L-shaped plate having a horizontal portion slidably extending in said slot and a fulcrum lug for engaging said first mentioned plate and having a vertical portion for closing said nozzle and yielding means connecting said plates for tightly drawing said vertical portion against said nozzle.

11. In a stall cock having a nozzle, a collar removably mounted on said nozzle, a plate on said collar, said plate having a slotted extension extending beyond said collar, an angular closure member for said nozzle having a vertical portion for closing said nozzle and a horizontal portion slidably hinged in said slotted extension and yielding means connecting said plate and member.

CHARLES J. STREBEL.

References Cited in the file of this patent

UNITED STATES PATENTS

| Number | Name | Date |
|---|---|---|
| 917,911 | Thompson | Apr. 13, 1909 |
| 1,125,606 | Tripp | Jan. 19, 1915 |
| 2,016,678 | Loomis | Oct. 8, 1935 |